US010604171B2

(12) United States Patent
Kwon (10) Patent No.: US 10,604,171 B2
(45) Date of Patent: Mar. 31, 2020

(54) STEERING COLUMN

(71) Applicant: MANDO CORPORATION, Pyeongtaek-si, Gyeonggi-do (KR)

(72) Inventor: HyunBi Kwon, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 136 days.

(21) Appl. No.: 15/879,873

(22) Filed: Jan. 25, 2018

(65) Prior Publication Data

US 2018/0208232 A1   Jul. 26, 2018

(30) Foreign Application Priority Data

Jan. 26, 2017 (KR) .......... 10-2017-0012720
Aug. 16, 2017 (KR) .......... 10-2017-0103838

(51) Int. Cl.
*B62D 1/184* (2006.01)
*B62D 1/187* (2006.01)
*B62D 1/19* (2006.01)

(52) U.S. Cl.
CPC ............ *B62D 1/184* (2013.01); *B62D 1/187* (2013.01); *B62D 1/192* (2013.01); *B62D 1/195* (2013.01); *B62D 1/197* (2013.01)

(58) Field of Classification Search
CPC ........ B62D 1/184; B62D 1/187; B62D 1/192; B62D 1/195; B62D 1/197
See application file for complete search history.

(56) References Cited

U.S. PATENT DOCUMENTS 9,233,707 B2 * 1/2016 Domig ................ B62D 1/195
2008/0236325 A1 * 10/2008 Ridgway ............ B62D 1/184
74/493

(Continued)

FOREIGN PATENT DOCUMENTS

DE   10 2009 009 577 B3   5/2010
KR   10-2015-0017917 A    2/2015

(Continued)

OTHER PUBLICATIONS

Office Action issued in corresponding German Application No. 10 2018 201 216.4, dated Mar. 26, 2019.

(Continued)

*Primary Examiner* — Drew J Brown
(74) *Attorney, Agent, or Firm* — Morgan, Lewis & Bockius LLP (57) ABSTRACT

The present disclosure provides a steering column of a vehicle, the steering column including: an inner tube; a fixed block disposed on the outer side of the inner tube in the axial direction of the steering column and having a plurality of fastening holes arranged in the axial direction of the steering column; an outer tube fitted on the outer side of the inner tube such that the inner tube can be moved in the axial direction of the steering column, and having distance portions disposed at both sides of the fixed block and having a first bolt hole; a movable block fastened to the fixed block and having a second bolt hole; a lever bolt disposed through the first bolt hole and the second bolt hole; and an elastic member coupled to the outer side of an end of the lever bolt and having both ends supported by the movable block and the distance portions and elastically supporting the movable block toward the fixed block.

8 Claims, 6 Drawing Sheets

(56) References Cited

U.S. PATENT DOCUMENTS

| | | | |
|---|---|---|---|
| 2010/0282016 A1* | 11/2010 | Oehri | B62D 1/184 74/493 |
| 2010/0300238 A1* | 12/2010 | Ridgway | B62D 1/184 74/493 |
| 2012/0024101 A1* | 2/2012 | Schnitzer | B62D 1/195 74/492 |
| 2012/0125139 A1* | 5/2012 | Tinnin | B62D 1/184 74/493 |
| 2012/0266716 A1* | 10/2012 | Sulser | B62D 1/184 74/493 |
| 2013/0074641 A1* | 3/2013 | Schnitzer | B62D 1/184 74/493 |
| 2013/0118292 A1* | 5/2013 | Sulser | B62D 1/184 74/493 |
| 2013/0327176 A1 | 12/2013 | Domig et al. | |

FOREIGN PATENT DOCUMENTS

| | | |
|---|---|---|
| KR | 10-1559821 B1 | 10/2015 |
| KR | 10-1618993 | 5/2016 |

OTHER PUBLICATIONS

Korean Office Action dated Oct. 1, 2018 issued in Korean Patent Application No. 10-2017-0103838.

\* cited by examiner

STEERING COLUMN

CROSS REFERENCE TO RELATED APPLICATION

This application claims priority from Korean Patent Application No. 10-2017-0012720, filed on Jan. 26, 2017, and Korean Patent Application No. 10-2017-0103838, filed on Aug. 16, 2017, which are hereby incorporated by reference for all purposes as if fully set forth herein.

BACKGROUND OF THE INVENTION

1. Field of the Invention

The present disclosure relates to a steering column of a vehicle and, more particularly, to a steering column of a vehicle that can telescope.

2. Description of the Prior Art

Recently, vehicles are equipped with a steering column additionally having a telescoping or tilting function for the convenience of drivers. A telescopic device is a device allowing a steering column to axially stretch and contract and a tilting device is a device for adjusting the angle of a steering column.

Automotive steering systems generally include a steering shaft, a steering column fitted on the steering shaft, a mounting bracket fixing the steering column to a car body, a distance member mounted on the steering column to allow a telescopic motion of the steering column, a fixed gear fixed on the distance member in close contact with it, a moving gear engaged with the fixed gear, a lever bolt disposed through the distance member, and a locking unit coupled to an end of the lever bolt.

The telescopic motion of the steering column is made by tightening and loosening a control lever. When the control lever is tightened, the moving gear is engaged with the fixed gear by a coupling force of the locking unit at the end of the lever bolt, thereby restricting the telescopic motion. When the control lever is loosened, the fixed gear and the moving gear are disengaged, thereby allowing the telescopic motion.

However, according to steering columns in the related art, there is a problem in that the lever bolt is not locked due to a tooth-on-tooth connection in which the ridges of the fixed gear are positioned on the ridges of the moving gear. In this case, the sense of operating the lever by a driver is deteriorated, and in the worst case, the gears may become broken and the driver may become upset.

Further, the steering column is not stably fixed due to the tooth-to-tooth connection, so there is a problem in that the steering column may pop up and the safety of the driver cannot be secured in a collision or a rear-end collision of a vehicle.

SUMMARY OF THE INVENTION

Embodiments have been made under this background and an aspect of the present disclosure is to provide a steering column of a vehicle in which a fixed gear and a moving gear can be stably engaged with each other when the steering column is locked to restrict a telescopic motion.

Another aspect of the present disclosure is to provide a steering column of a vehicle, the steering column being able to secure the safety of a driver because it does not pop up in a collision or a rear-end collision of a vehicle by absorbing a collision load when a collision load is applied to the steering column due to a collision or a rear-end collision of a vehicle.

The aspects of the present disclosure are not limited thereto, and other aspects and advantages of the present disclosure will be understood from the following description.

A steering column of a vehicle according to the present disclosure includes: an inner tube; a fixed block disposed on the outer side of the inner tube in the axial direction of the steering column and having a plurality of fastening holes arranged in the axial direction of the steering column; an outer tube fitted on the outer side of the inner tube such that the inner tube can be moved in the axial direction of the steering column, and having distance portions disposed at both sides of the fixed block and having a first bolt hole; a movable block fastened to the fixed block and having a second bolt hole; a lever bolt disposed through the first bolt hole and the second bolt hole; and an elastic member coupled to the outer side of an end of the lever bolt and having both ends supported by the movable block and the distance portions and elastically supporting the movable block toward the fixed block.

A stopper supporting and spacing the movable block away from the fixed block when the lever bolt is unlocked may be formed on the outer side of the lever bolt.

The fixed block has: a guide portion protruding from the outer side of the inner tube and disposed in the axial direction of the steering column; and a load-absorbing portion coupled to a side of the guide, having a plurality of fastening holes spaced from each other in the axial direction of the steering column, and absorbing a collision load by being supported and plastically deformed in a collision of a vehicle.

The load-absorbing portion may be coupled to the fastening hole by a coupling member, which is cut when a collision load that is a set value or more is applied to the steering column, to be separable from the guide portion.

A space may be defined inside the guide portion, a first end portion of the load-absorbing portion bends into the space inside the guide portion, and the bending portion may be supported by the guide portion.

A bending guide supported by the bending portion of the load-absorbing portion and contributing to plastic deformation in a collision of a vehicle may be formed at an end of the guide portion.

The movable block may have: a block body having the first bolt hole; and a fastening portion formed on a first side of the block body and having a fastening projection corresponding to the fastening hole.

The movable block may have a support groove supporting the elastic member on a second side of the block body.

According to the present disclosure, even if the fastening projection of the movable block is positioned between the fastening holes of the fixed block in a telescopic motion-locked state, the movable block keeps pressing the fixed block by elasticity of the elastic member, and the fastening projection of the movable block is inserted into an adjacent fastening hole of the fixed block when a predetermined shock etc. is applied in the axial direction of the steering column, so the steering column can be stably locked.

Further, according to the present disclosure, when a collision load of a set value or more is applied to the steering column due to a collision or a rear-end collision of a vehicle, the load-absorbing portion of the fixed block is separated from the guide portion and the guide portion is moved in the axial direction of the steering column and supported by the bending load-absorbing portion, whereby the load applied to the steering column is absorbed. Accordingly, popping-up of the steering column due to external shock is prevented, so safety of a driver can be secured.

The effects of the present disclosure are not limited thereto and it should be understood that the effects include all effects that can be inferred from the configuration of the present disclosure described in the following specification or claims.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, the present disclosure is described with reference to the accompanying drawings. However, the present disclosure may be modified in various different ways and is not limited to the embodiments described herein. Further, parts irrelevant to the present disclosure are omitted in the drawings to make the present disclosure clear and the same reference numerals are designated to the same or similar components throughout the specification.

In embodiments of the present disclosure, when it is described that an element is "connected" to another element, not only the first element may be "connected directly" to the second element, but the first element may also be "electrically connected" to the second element while a third element is interposed therebetween. In the entire specification of the present application, when it is described that a certain unit "includes" a certain element, this means that the unit may include any other element rather than exclude the any other element unless otherwise described.

Hereinafter, embodiments are described in detail with reference to the accompanying drawings.

Figure 1:
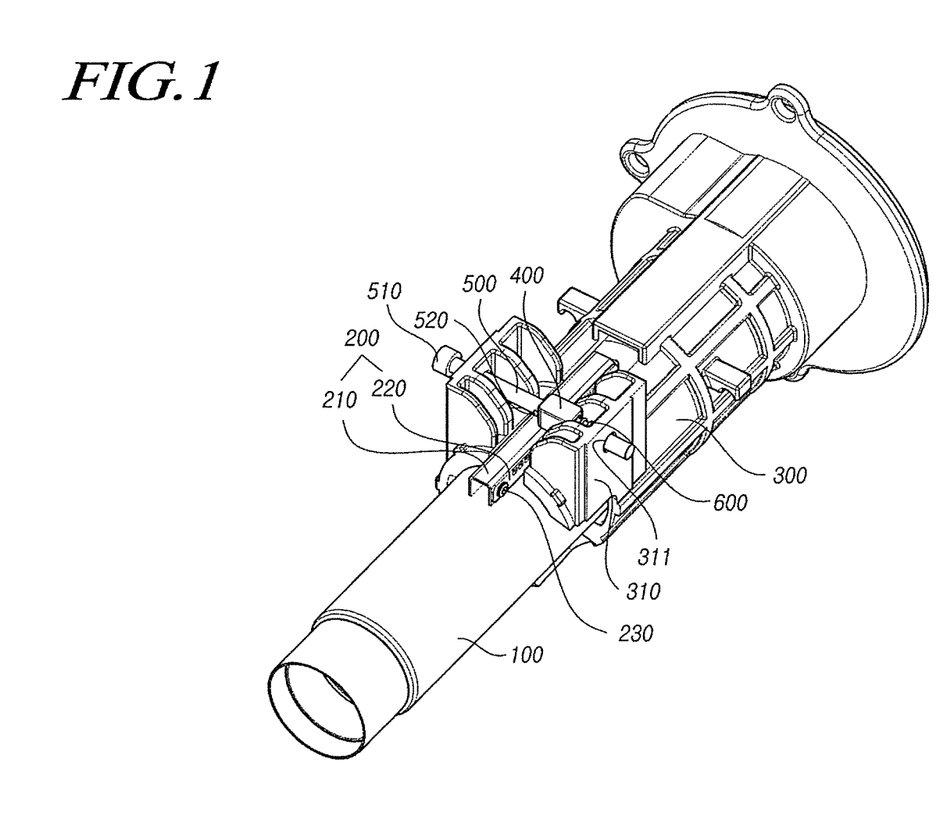
FIGS. 1 and 2 are perspective views of a steering column according to embodiments.
Figure 2:
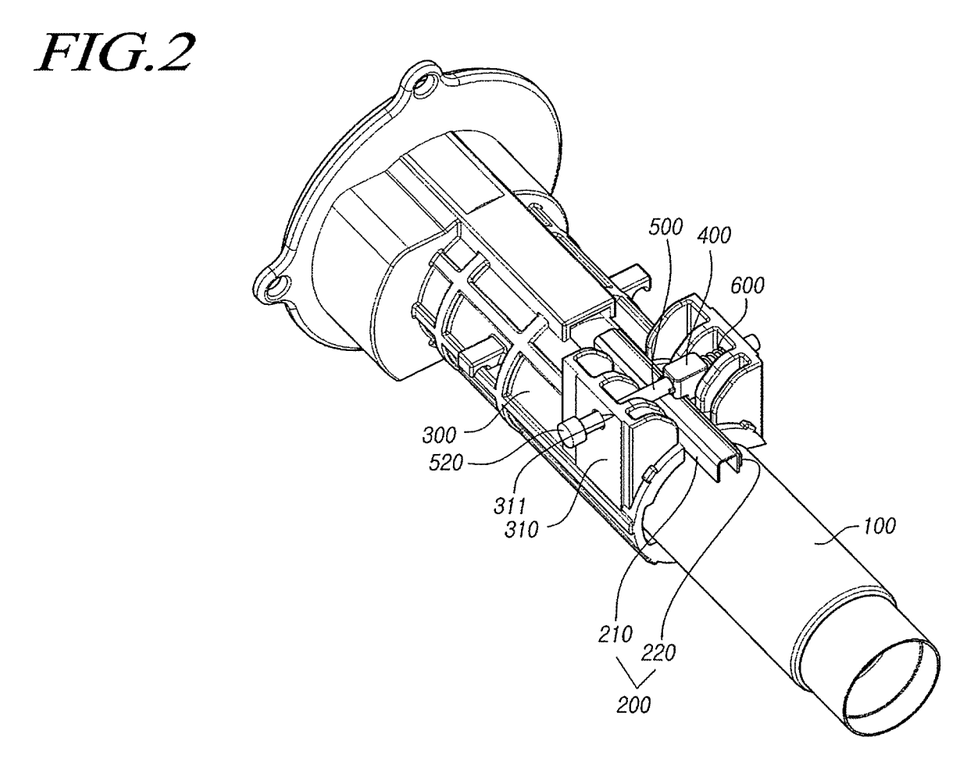
Figure 3:
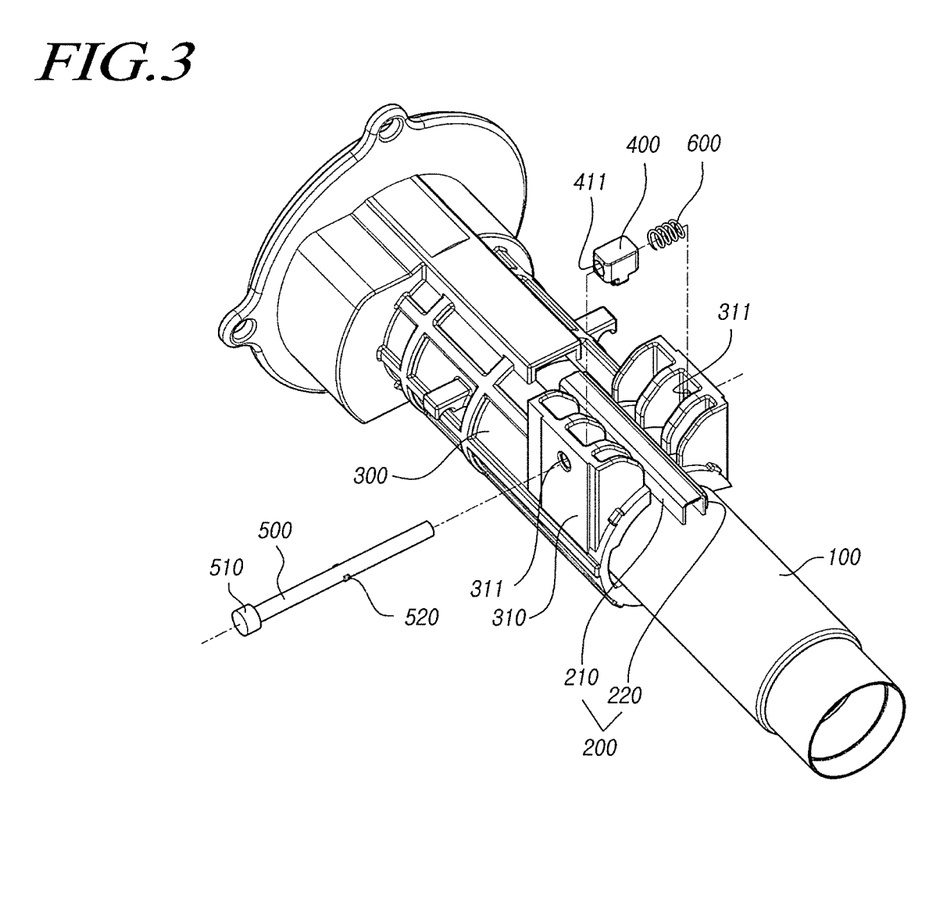
FIGS. 3 and 4 are exploded perspective views of the steering column according to embodiments.
Figure 4:
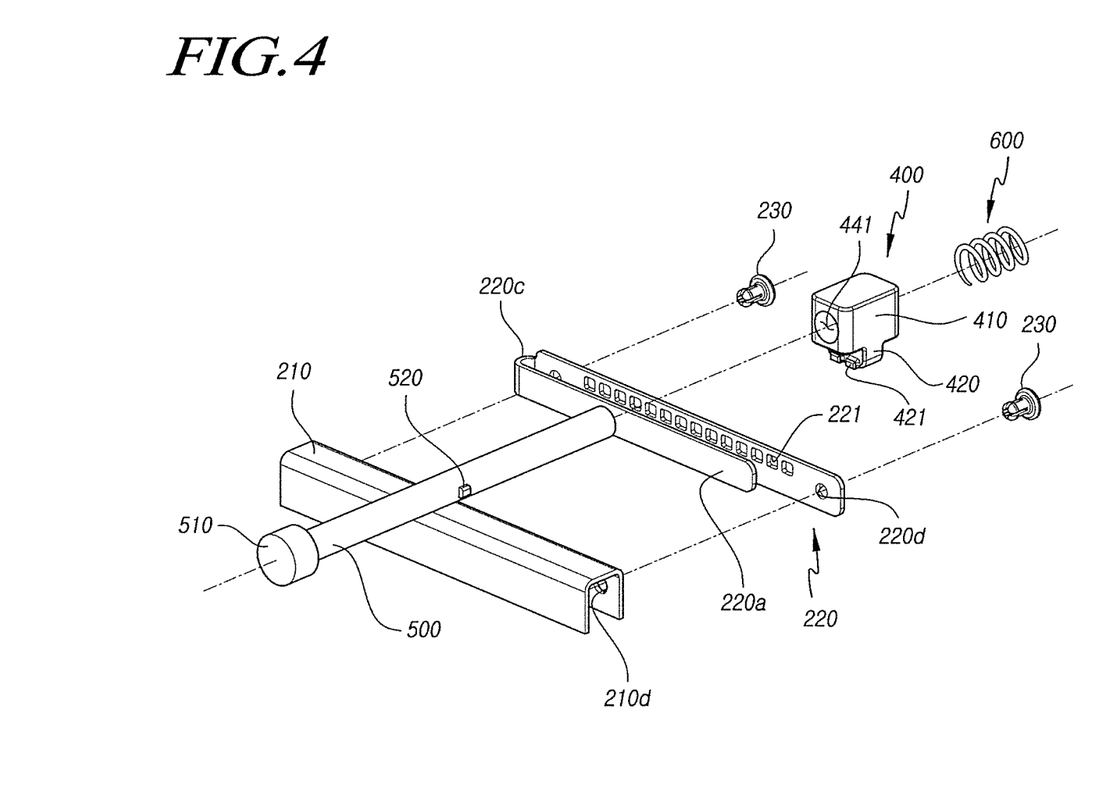
Figure 5:
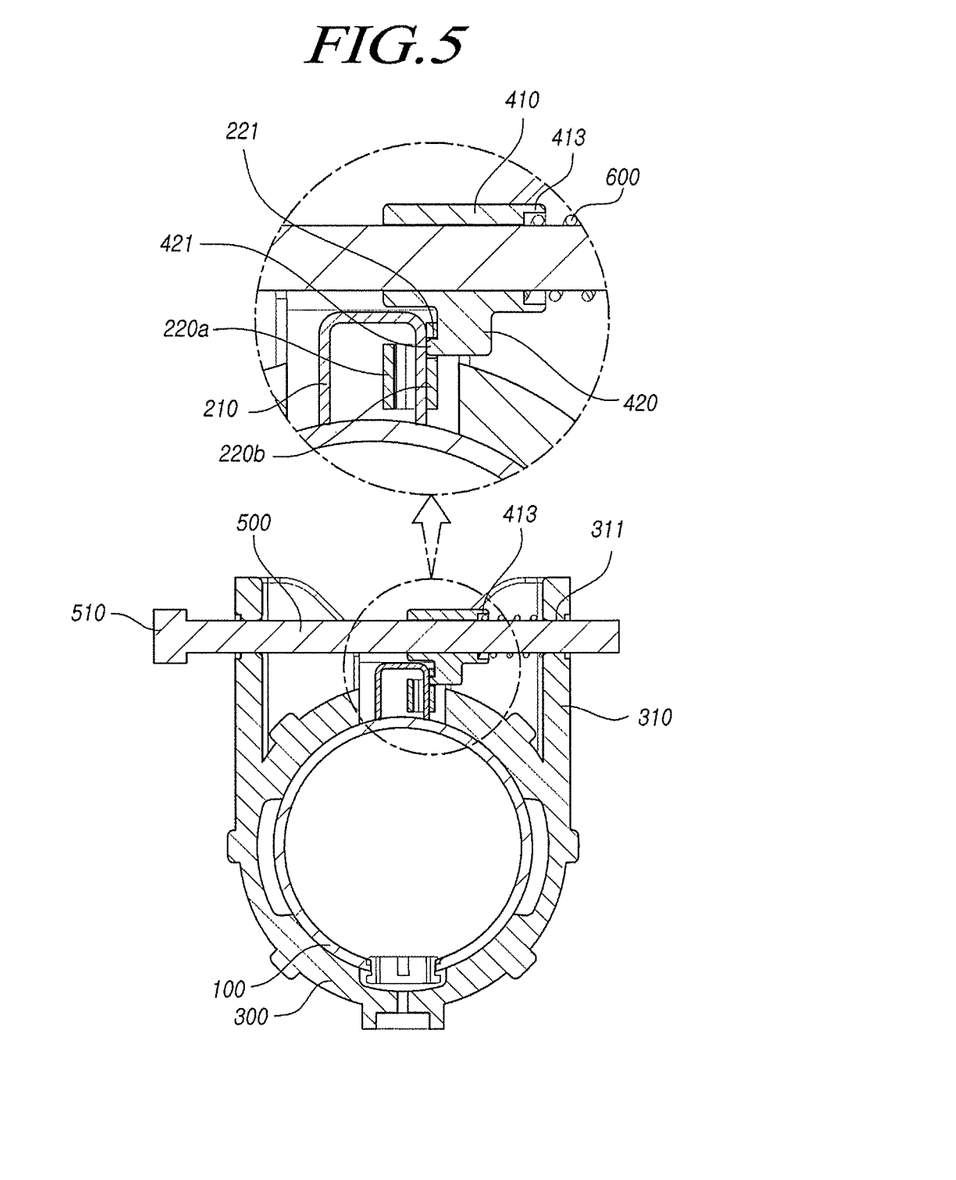
FIG. 5 is a cross-sectional view of the steering column according to embodiments.
Figure 6:
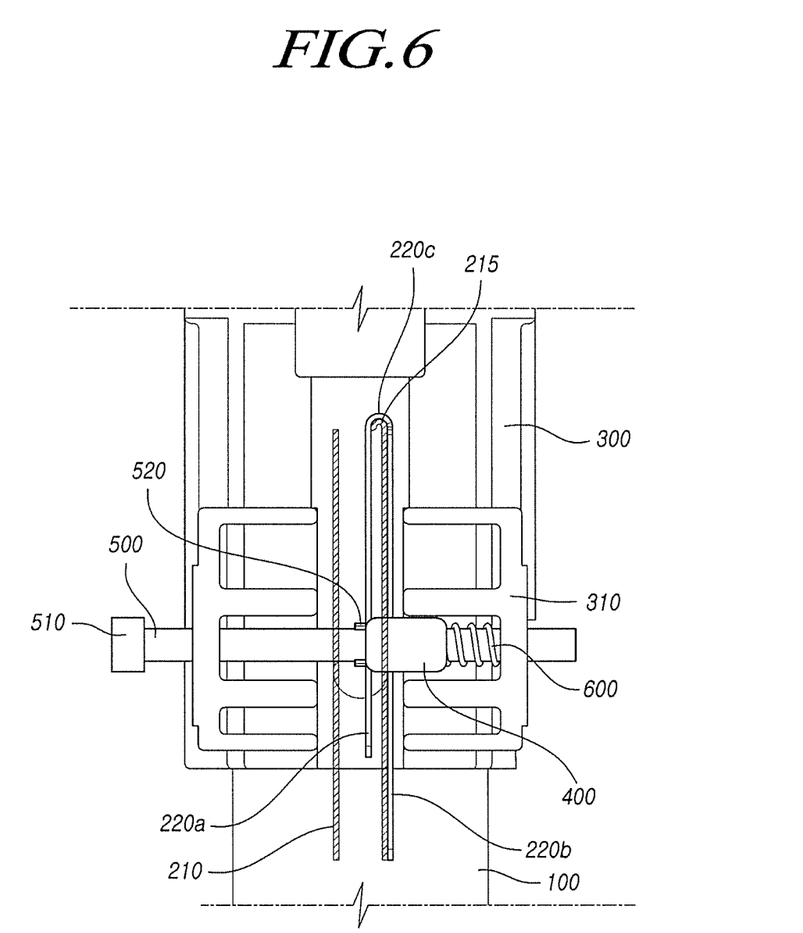
FIG. 6 is plan view showing a portion of the steering column according to embodiments.

FIGS. 1 and 2 are perspective views of a steering column according to embodiments, FIGS. 3 and 4 are exploded perspective views of the steering column according to embodiments, FIG. 5 is a cross-sectional view of the steering column according to embodiments, FIG. 6 is plan view showing a portion of the steering column according to embodiments.

Referring to the figures, a steering column of a vehicle according to embodiments includes an inner tube 100, a fixed block 200, an outer tube 300, a movable block 400, a lever bolt 500, and an elastic member 600.

The inner tube 100 is substantially a hollow cylinder and a steering shaft is inserted in the inner tube 100.

The fixed block 200 is elongated in the axial direction of the steering column on the outer side of the inner tube 100. For example, the fixed block 200 can be fixed to the inner tube 100 by welding or coupling members.

The fixed block 200 has a guide portion 210 that guides the inner tube 100 axially moving with respect to the outer tube 300 and a load-absorbing portion 220 coupled to a side of the guide portion 210.

The guide portion 210 has substantially a Π-shaped cross-section to define a space inside, and a portion of the load-absorbing portion 220, that is, a bending receiving portion 220a of the load-absorbing portion 220 is received in the internal space of the guide portion 210. The load-absorbing portion 220 has a plurality of fastening holes 221 formed with regular intervals through a coupling portion coupled to a side of the guide portion 210 and arranged in the axial direction of the steering column, and the receiving portion 220a bending from an end of the coupling portion 220b and received in the guide portion 210.

The load-absorbing portion 220 may be made of a material having sufficient strength and elasticity, for example, spring steel to be able to support the guide portion 210 when a collision load is applied to the steering column. A bending guide 211 that guides the load-absorbing portion 220 rolling and unrolling may be formed at a first end of the guide portion 210. The bending guide 211 is formed to be convex outward from the guide portion 210 with a predetermined curvature and is axially moved while supporting a bending portion 220c of the load-absorbing portion 220.

The outer tube is fixed to a car body by a mount bracket (not shown) and movably fitted on the inner tube 100. That is, when the lever bolt 500 is unlocked for a telescopic motion, the inner tube 100 can be drawn into or out of the outer tube 300, and even in a collision of a vehicle, the inner tube 100 can absorb a collision load by being drawn into the outer tube 300.

Distance members 310 radially facing each other are disposed at an end of the outer tube 300. The distance members 310 are symmetrically disposed at both sides of the fixed block 200. For example, the distance members 310 may be integrally formed with the outer tube 300 or may be separately manufactured and then combined with the outer tube 300. If necessary, a tilting bracket (not shown) may be disposed outside the distance members 310 and it can contribute to changing the tilting angle of the steering column.

A first bolt hole 311 is formed through the distance members 310 to insert the lever bolt 500 through them. The movable block 400 is coupled to the fixed block 200 to restrict a telescopic motion of the steering column or is separated from the fixed block 200 to allow for a telescopic motion of the steering column.

The movable block 400 is coupled between the load-absorbing portion 220 and a first distance member 310 by the elastic member 600.

The movable block 400 has a block body 410 and a fastening portion 420 protruding from a first side of the block body 410. A second bolt hole 411 through which the lever bolt 500 is disposed is formed through which the block body 410 in the radial direction of the steering column (axial direction of the lever bolt). The fastening portion 420, as shown in FIG. 4, protrudes from the lower portion of the block body 410 and at least one fastening projection 421 is formed on a side of the fastening portion 420 to be coupled to the fastening hole 221 of the load-absorbing portion 220.

The movable block 400 has a support groove 413 on a second side of the block body 410 to support the elastic member 600, so the elastic member 600 contracts and returns while being supported by the support groove 413, thereby preventing a rattling noise in operation.

The lever bolt 500 is connected to a control lever (not shown) and is rotated when the control lever is operated, thereby allowing the steering column to telescope. A stopper 510 supporting the movable block 400 may be formed at a first end of the lever bolt 500. A cam unit (not shown) that axially spaces and returns the movable block 400 in the axial direction of the lever bolt 500 may be disposed between the control lever and the lever bolt 500 and is a general component for tilting or telescopic a steering column, so it is not described in detail herein.

The lever bolt 500 is disposed through the pair of distance members 310 facing each other. The first end of the lever bolt 500 protrudes out of the first distance member 310 and a thread may be formed on the outer side of the protruding portion of the lever bolt 500 to fasten a lever nut (not shown).

The elastic member 600 is coupled to the first end of the lever bolt 500 and is positioned between the first distance member 310 and the movable block 400. That is, the elastic member 600 is supported on the inner sides of the distance members 310 and elastically support the movable block 400 so that the movable block 400 is sufficiently spaced from the fixed block 200 when the control lever is loosened. A coil spring may be fitted on the outer side of the lever bolt 500 as the elastic member 600.

The lever bolt 500 may have a head 510 having a larger diameter than the lever bolt 500 at a second end, in which the head 510 may be coupled to the control lever by a cam unit etc. on a second distance member 310.

The lever nut is coupled to the end portion, which protrudes out of the movable block, of the lever bolt 500, and a bearing or a washer may be disposed between the outer sides of the distance members 310 and a lock nut, but this is a general configuration for tilting or telescoping a steering column, so it is not described in detail herein.

The operation of the steering column of a vehicle that has this configuration is described hereafter.

First, when the control lever is loosened and the lever bolt 500 is rotated in a predetermined direction and unfastened from the locking unit 700, the elastic member 600 is compressed as much as the movement amount of the cam unit and the movable block 400 is spaced away from the fixed block 200, whereby a telescopic motion-locked state is removed. Accordingly, a driver can telescope the steering column by moving the inner tube.

However, the driver should change the telescopic motion-unlocked state into the telescopic motion-locked state after adjusting the angle of the steering column to fit the shape of his/her body. Accordingly, when the lever bolt 500 is rotated in the opposite direction by operating the control lever, the lever bolt 500 and the lever nut are fastened to each other and the elastic member 600 is returned as much as the movement amount of the cam unit and supports the movable block 400 toward the fixed block 200, so the movable block 400 is coupled to the fixed block 200.

However, the fastening projection 421 of the movable block 400 may be positioned between the fastening holes 221 in the telescopic motion-locked state, but in this case, the movable block 400 keeps pressing the fixed block by the elasticity of the elastic member 600, and the fastening projection 421 of the movable block 400 is slid and inserted into an adjacent fastening hole 221 of the fixed block 200 when predetermined shock is applied to the steering column, so the steering column can be stably locked.

Meanwhile, when a collision load of a set value or more is applied to the steering column, the coupling member 230 is cut and the load-absorbing portion 220 coupled to the guide portion 210 through the coupling member 230 is separated from the guide portion 210, so the guide portion 210 is moved together with the inner tube 100 in the axial direction of the steering column (in a collapse direction).

In a general collision of a vehicle in which a collision load of the set value or less is applied to the steering column, since the coupling portion 220a of the load-absorbing portion 220 is fixed to the guide portion 210 by the coupling member 230, when the inner tube 100 is collapsed in the axial direction of the steering column by the collision load, the guide portion 210 collapses while supporting the bending portion 220c of the load-absorbing portion 220 and the bending portion 220c of the load-absorbing portion 220 is gradually unrolled, that is, plastically deformed, whereby the collision load applied to the steering column is absorbed.

Accordingly, popping-up of the steering column due to external shock in a collision of a vehicle is prevented, so the safety of a driver can be secured.

Further, a bending guide 215 that is supported by the bending portion 220c of the load-absorbing portion 220 to contribute to plastic deformation in a collision of a vehicle is formed at an end of the guide portion 220, so when the bending portion 220c of the load-absorbing portion 220 plastically deforms by unrolling, it can smoothly deform without stopping.

The above description is provided as an exemplary embodiment of the present disclosure and it should be understood that the present disclosure may be easily modified in other various ways without changing the spirit or the necessary features of the present disclosure by those skilled in the art.

That is, the embodiments described above are only examples and should not be construed as being limitative in all respects. For example, the components described as a single part may be divided and the components described as separate parts may be integrated.

The scope of the present disclosure is defined by the following claims, and all of changes and modifications obtained from the meaning and range of claims and equivalent concepts should be construed as being included in the scope of the present disclosure.

What is claimed is:

1. A steering column comprising:
   an inner tube;
   a fixed block disposed on an outer side of the inner tube in an axial direction of the steering column, the fixed block having a plurality of fastening holes arranged in the axial direction of the steering column;
   an outer tube fitted on the outer side of the inner tube such that the inner tube can be moved in the axial direction of the steering column, the outer tube having distance members disposed at both sides of the fixed block and having a first bolt hole;
   a movable block configured to be coupled to and separable from the fixed block, and having a second bolt hole;
   a lever bolt disposed through the first bolt hole and the second bolt hole, such that the lever bolt extends through a center of the movable block; and
   an elastic member coupled to an outer side of an end of the lever bolt the elastic member having both ends supported by the movable block and the distance members and elastically supporting the movable block toward the fixed block,
   wherein the fixed block has an upside-down "U"-shape having a closed upper surface and an opened lower surface, and has the plurality of fastening holes on a closed side surface thereof.

2. The steering column of claim 1 wherein a stopper supporting and spacing the movable block away from the fixed block when the lever bolt is unlocked is disposed on an outer side of another end of the lever bolt.

3. The steering column of claim 1, wherein the fixed block has:
   a guide portion protruding from the outer side of the inner tube and disposed in the axial direction of the steering column; and
   a load-absorbing portion coupled to a side of the guide, having the plurality of fastening holes spaced from each other in the axial direction of the steering column, and absorbing a collision load by being supported and plastically deformed in a collision of a vehicle.

4. The steering column of claim 3, wherein the load-absorbing portion coupled to the guide hole by a coupling member is configured to be separate from the guide portion when the collision load that is a set value or more is applied to the steering column.

5. The steering column of claim 3, wherein a space is defined inside the guide portion, a first end portion of the load-absorbing portion bends into the space inside the guide portion, and a bending portion is supported by the guide portion.

6. The steering column of claim 5, wherein a bending guide, which is supported by the bending portion of the load-absorbing portion and configured to contribute to plastic deformation in the collision of the vehicle, is located at an end of the guide portion.

7. The steering column of claim 1, wherein the movable block includes:
   a block body having the second bolt hole; and
   a fastening portion disposed on a first side of the block body and having a fastening projection corresponding to a corresponding fastening hole.

8. The steering column of claim 7, wherein the movable block has a support groove supporting the elastic member on a second side of the block body.

* * * * *